July 9, 1929.    J. ROBINSON    1,720,257

AUTOMATIC TRAIN PIPE CONNECTER

Original Filed Sept. 13, 1921

INVENTOR
Joseph Robinson
BY
ATTORNEYS

Patented July 9, 1929.

1,720,257

UNITED STATES PATENT OFFICE.

JOSEPH ROBINSON, OF NEW YORK, N. Y.

AUTOMATIC TRAIN-PIPE CONNECTER.

Application filed September 13, 1921, Serial No. 500,356. Renewed March 3, 1928.

My invention relates to improvements in automatic train pipe couplings and particularly to means for renewing defective gaskets between the faces of mated coupling heads. In my co-pending application Serial No. 488,373, filed July 29th, 1921, for improvements in automatic train pipe connecters, I illustrate and describe an improved form of such means. It is the object of my present invention to improve the construction illustrated in that application.

My invention resides in the combinations, arrangements, and constructions hereinafter described, pointed out in the appended claims, and illustrated in the accompanying drawings in which:

Figure 1:
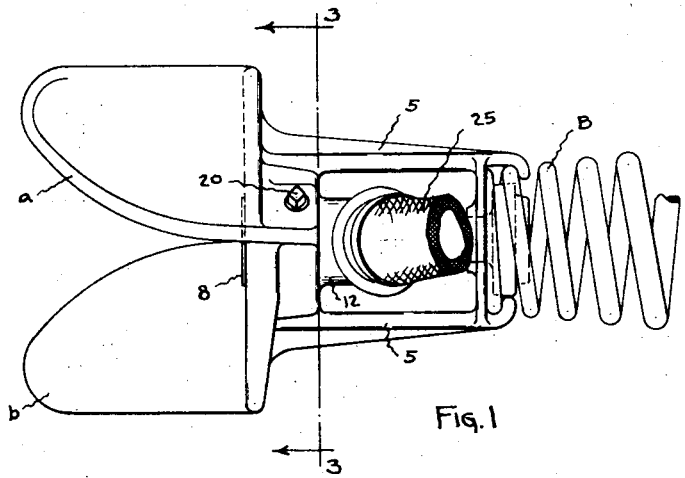
Figure 1 is a side elevation of a coupling head provided with my improvement.
Figures 2, 3:
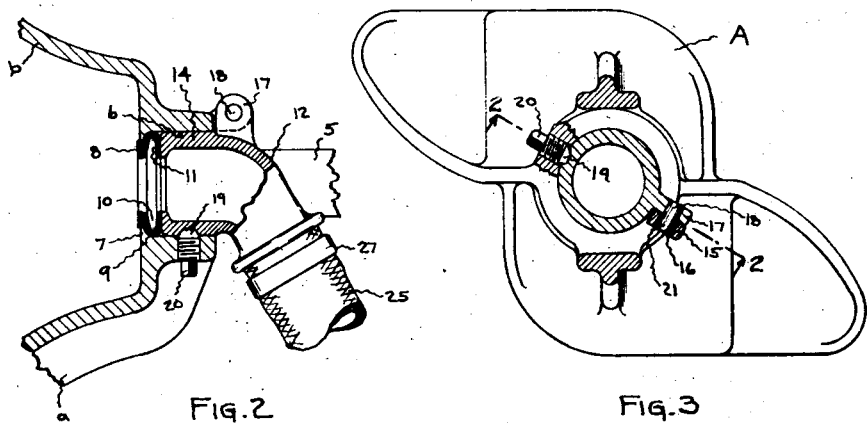
Figure 2 is a sectional view of the coupling head shown in Figure 1, taken on the line 1—1 of Figure 3. In this view a part of the construction shown in Figure 1 is omitted.
Figure 3 is a rear view of the coupling head shown in Figure 1 and taken on the line 3—3 of Figure 1

Referring now to the drawings: My improvement may of course be employed with any suitable form of coupling head, which may be supported from the car in any desired manner. I illustrate at A a suitable form of coupling head, provided with guides *a* and *b* to align it with a companion head and at B I indicate one of the several well known types of train pipe coupling supports such, for instance, as that illustrated in my co-pending application Serial No. 401,976, filed August 7th, 1920, for improvement in automatic train pipe couplings. The straps 5 forming a part of the support for my improvement may be cast integral with the head A, as shown in the accompanying drawings, or they may be formed separately of the head and secured thereto in any desired manner, this being unimportant. It is, of course, understood that one or more of my improved means for renewing defective gaskets may be employed on the coupling head A, and that one thereof will be required for each port in the coupling head. I illustrate a coupling head having a single port such as employed for use on freight cars. The port, or perforation, is indicated at 6 in Figure 2 and is preferably located centrally of the head A between the straps 5 and extends entirely through the head. On the forward wall 7 of the perforation 6, I form a seat for the gasket 8, the gasket having a flange 9 provided with an interior annular groove 10 to admit a fluid to the gasket and cause the latter to expand into tight engagement with its seat aforesaid and against the front flat face 11 of the fitting or conduit 12 whereby a force will be exerted rearwardly against the conduit 12 to cause it to be more firmly locked in the opening. The enlarged forward end 14 of the conduit 12 extends into the perforation 6 and has supporting or abutting relation to the gasket 8, the fitting being rotatable in the perforation 6 as hereinafter described. Extending rearwardly from the coupling head adjacent to the perforation 6, I provide a projection 15 having an opening 16 therethrough, and radiating from a side of the fitting or conduit 12 I provide a lug 17 having suitably secured thereto a pin or stem 18, the pin and the lug 17 constituting an anchor device. Diametrically opposite the lug 17 I provide the fitting with a hole or depression adapted to receive the tapered end 19 of a set screw or threaded device 20 threaded through a wall of the coupling head A, the set screw serving to force the enlarged end 14 of the conduit 12 firmly against the opposite wall of the perforation 6 and positively lock the conduit in the service position with the pin 18 properly positioned in the opening in the projection 15. It will be understood that the gasket 8 is normally under slight initial compression, the tapered end 21 of the pin 18 and the tapered end 19 of the set screw 20 serving to force the conduit 12 inwardly against the gasket, as the conduit is moved to its final assembled position, thus slightly compressing the gasket. When it is desired to remove a defective gasket 8 from between the faces of mated coupling heads A, the said screw 20 is backed out of the coupling head sufficiently to carry its point 19 away from the conduit 12 whereupon the conduit is rotated slightly to lift the pin 18 out of the opening 16 in the projection 15. This releases the conduit 12 from the coupling head and permits it and the gasket 8 to be readily removed. The reverse of this operation will re-assemble the parts.

Figure 4:
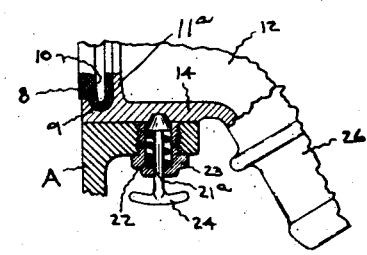
Figure 4 is an enlarged fragmentary sectional view of a modification of my improvement.

In Figure 4 I illustrate one of the several modifications which may be made in my invention without departing from the scope thereof. In this modification the gasket 8 is mounted in an annular seat in the forward end of the conduit 12, the front flange or portion of the gasket, that is, the portion in front of the groove 10, is adapted to contact with a similar gasket on a mating head and the rear flange thereof is adapted to rest against an inwardly projecting flange 11$^a$ on the conduit, and in place of the set screw 20 a spring actuated plunger 21$^a$ is employed to prevent undesired rotation of the conduit, the plunger and its actuating spring 22 being confined within a casing 23 which is threaded into a wall of the coupling head A as shown. With this construction a slight pull on the head 24 of the plunger will disengage it from the conduit and permit the latter to be removed from the perforation 6. Other modifications may, of course, be made in my invention such for instance as omitting the lug 17 and the projection 15 or adding additional ones thereof.

The usual train pipe hose 25 may be connected to my improved conduit 12 in any desired manner. I preferably connect it direct to the shank 26, Figure 4, of the conduit 5 by a suitable clamp 27.

What I claim is:

1. In combination, a perforated train pipe coupling head, a conduit extending into the perforation and supporting a gasket therein, and means to permit the removal of said gasket from said perforation while the coupling head is coupled to a companion head, said means including a projection on the coupling head at one side of the perforation therein, the projection being provided with an opening, and an anchor device carried by the conduit and adapted to overlap said projection and occupy the opening in the latter.

2. In combination, a perforated train pipe coupling head, a conduit mounted in said perforation and supporting a gasket therein, and means to permit the removal of said conduit and said gasket from said perforation while said coupling head is coupled to a companion head, said means including a projection on the coupling head at one side of the perforation therein, the projection being provided with an opening, and an anchor device secured to one side of the conduit and overlapping said projection and adapted to be rotated into the opening in the latter.

3. In combination, a perforated train pipe coupling head, a conduit mounted in said perforation and supporting a gasket therein, the conduit being under certain conditions rotatable in the perforation, guides to align the head to a companion head, and means to permit the removal of said conduit and said gasket from said perforation while said coupling head is coupled to a companion head, said means including a projection on the coupling head, at one side of the perforation therein, the projection being provided with an opening, and an anchor device secured to the conduit and overlapping said projection and adapted to be rotated into the opening in the latter by rotating said conduit.

4. In combination, a train pipe coupling head provided with an opening and having formed on a wall of the opening a seat for a gasket, a gasket mounted on said seat, a conduit extending into the opening and abutting the rear face of the gasket to maintain the latter on said seat, and means to permit the gasket to be extracted from said coupling while the head is coupled to a companion head, said means including a projection on said coupling head at one side of said opening and a lug on one side of the conduit, the lug overlapping the projection and having interlocking engagement therewith.

5. In combination, a train pipe coupling head provided with an opening and having formed on a wall of the opening a seat for a gasket, a gasket mounted on said seat, a conduit extending into the opening and abutting the rear face of the gasket to maintain the latter on said seat under compression, the gasket being provided with an interior annular groove to admit a fluid to the gasket into tight engagement with said seat and said conduit, and means to permit removal of the gasket from said coupling head while the head is coupled to a companion head, said means including a projection on said coupling head on one side of said opening and a lug on the conduit, the lug overlapping the projection and having interlocking engagement therewith.

6. In combination, a perforated train pipe coupling head, a conduit mounted in said perforation and suporting a gasket therein, the conduit being rotatable in the head under certain conditions, guides to align the head with a companion head, means to permit said gasket to be removed from said perforation while said coupling head is coupled to a companion head, said means including a projection on the coupling head at one side of said perforation, the projection being provided with an opening, an anchor device secured to the conduit and overlapping said projection and adapted to be rotated into the opening in the projection by rotating said conduit and means to prevent rotation of the conduit when the latter is assembled in the coupling head.

7. In combination, a perforated train pipe coupling head, a conduit mounted for rotation in said perforation and supporting a gasket therein, means co-acting with the conduit to place the gasket under compression and to permit removal of the gasket from said perforation while said coupling head remains coupled to a companion head, said means including a projection on the coupling head at one side of said perforation, the projection being provided with an opening, a lug on the conduit overlapping said projection and having a stem adapted to be rotated into the opening in said projection, and means for maintaining said stem in said opening.

8. In combination, a perforated train pipe coupling head, a conduit mounted in said perforation, and means to permit the removal of said conduit from said perforation while said coupling head is coupled to a companion head, said means including a projection on the coupling head at one side of the perforation therein, said projection being provided with an opening, and an anchor device secured to one side of the conduit and overlapping said projection and adapted to be rotated into the opening in the latter.

9. In combination, a train pipe coupling head having an opening therein, a conduit mounted in said opening, a lug on said head adjacent said opening, a lug on said conduit, one of said lugs having an opening therein and the other having a pin secured thereto, said pin and last named opening being so positioned that the pin will enter the opening upon rotation of the conduit in said opening in the head, whereby the conduit is held in position in the head.

10. In combination, a train pipe coupling head having an opening therein, a projection extending rearwardly from said head on one side of said opening, a conduit rotatably mounted in said opening, said conduit having a straight portion lying in said opening and having a curved portion extending laterally of said straight portion, a lug on said conduit adjacent the rear end of the straight portion thereof, said lug being adapted to contact with said projection on the head, and means carried by one of said last mentioned parts and adapted to enter the other part when said conduit is rotated in the head, for the purpose set forth.

In testimony whereof I hereunto affix my signature.

JOSEPH ROBINSON.